United States Patent [19]

Froumajou

[11] 4,382,629
[45] May 10, 1983

[54] CONVERTIBLE SEAT STRUCTURE FOR AN AUTOMOBILE VEHICLE

[75] Inventor: Armand Froumajou, Osny, France

[73] Assignees: Automobiles Peugeot; Societe Anonyme Automobiles Citroen, both of Paris, France

[21] Appl. No.: 212,097

[22] Filed: Dec. 2, 1980

Related U.S. Application Data

[63] Continuation of Ser. No. 12,221, Feb. 14, 1979, abandoned.

[30] Foreign Application Priority Data

Mar. 20, 1978 [FR] France ............................... 78 08017

[51] Int. Cl.³ .............................................. B60N 1/02
[52] U.S. Cl. .................................... 297/322; 297/324; 297/334; 296/66
[58] Field of Search ..................... 297/316, 319–322, 297/324, 331, 334, 336; 296/65 R, 66

[56] References Cited

U.S. PATENT DOCUMENTS

| | | | |
|---|---|---|---|
| 2,152,505 | 3/1939 | Stuart et al. | 296/65 R |
| 2,926,948 | 3/1960 | Koplin et al. | 297/322 X |
| 3,001,820 | 9/1961 | Morphew | 297/324 |
| 3,381,999 | 5/1968 | Steene | 297/481 |
| 4,124,250 | 11/1978 | Weinich | 296/66 X |

*Primary Examiner*—Francis K. Zugel
*Attorney, Agent, or Firm*—Burns, Doane, Swecker & Mathis

[57] ABSTRACT

A convertible seat structure for an automobile vehicle includes a seat pivotably connected to the vehicle by a link member and a backrest pivotably connected to the vehicle at a pivot. At least one connecting bar connects the backrest and the seat with a pivotal movement of the backrest moving the seat longitudinally with respect to the vehicle and pivotally about the pivotal connection with the link member.

10 Claims, 4 Drawing Figures

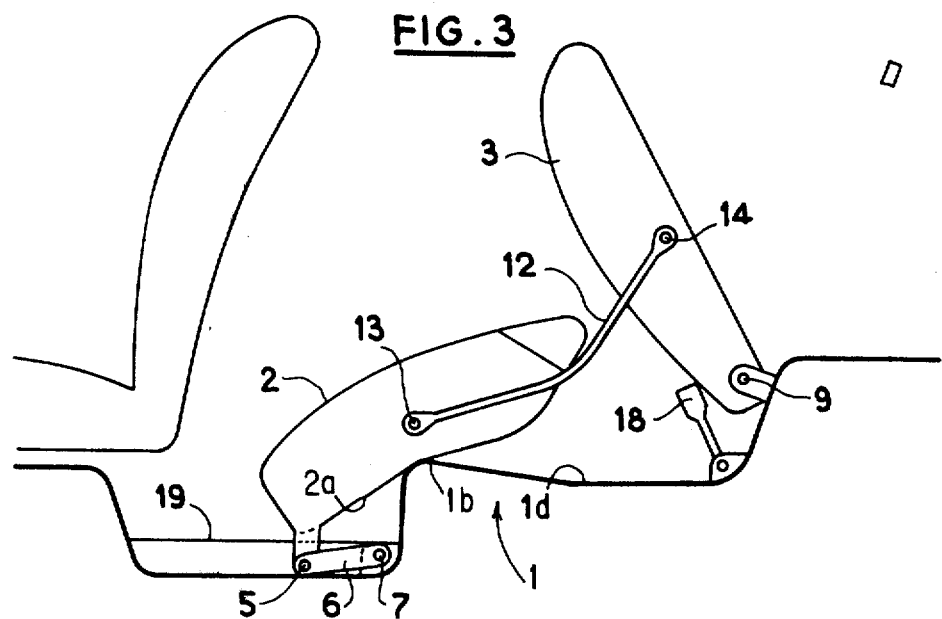
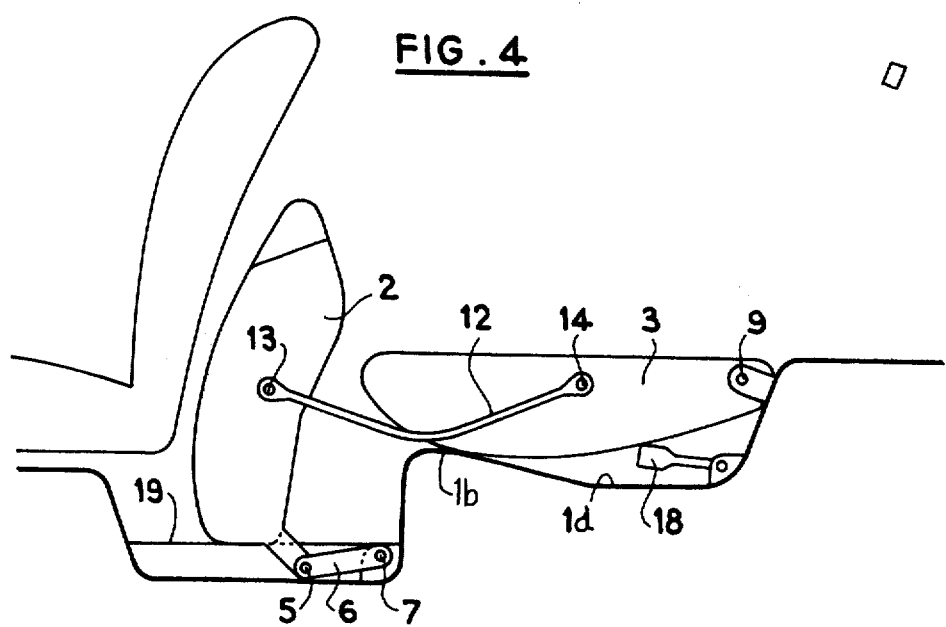

CONVERTIBLE SEAT STRUCTURE FOR AN AUTOMOBILE VEHICLE

This is a continuation, of application Ser. No. 12,221, filed Feb. 14, 1979, now abandoned.

DESCRIPTION

The present invention relates to convertible seat structures employed in particular at the rear of vehicles of the semi-utility or break type. It more particularly relates to seat structures formed by a seat proper or cushion which is pivotally mounted by its lower front part and is raisable forwardly, and a backrest which is pivotally mounted in its lower part and is also capable of being swung over forwardly to take up the place left free by the seat proper.

For this type of seat structures, which are already currently employed, it is usually necessary to shift the seat and the backrest in succession. However, it has already been proposed (see U.S. Pat. No. 3,001,820) to connect the seat and the backrest by a pivoted bar so that the movements of the seat and the backrest occur simultaneously by a single operation of the operator.

Unfortunately, the proposed arrangement has drawbacks:

the point at which the connecting bar is pivoted on the seat proper must be located at a relatively high level so that the bar constitutes a considerable hindrance to access to the seat;

it is not possible to engage the rear of the seat under the base of the backrest so that when the cushion of the seat is crushed under the weight of an occupant of the seat structure there is a gap between the seat and the backrest through which objects placed on the seat may fall, this gap being moreover disadvantageous from the point of view of comfort and appearance.

An object of the invention is to provide an improvement in the seat structure described in the aforementioned patent so as to overcome the drawbacks of this known seat structure.

The invention is therefore applied to a convertible seat structure for an automobile vehicle, which comprises a seat proper which is raisable in the forward direction about a first transverse axis, a backrest which is capable of being swung over forwrdly about a second transverse axis, and at least one connecting bar which is pivoted to the seat and to the backrest for ensuring that the movements of these two elements occur simultaneously.

In this seat structure, the first transverse axis is disposed at one end of at least one link whose other end is pivoted to the floor of the vehicle to pivot about a third transverse axis, the at least one link or each link having a vertical orientation or an orientation close to the verticle when the seat structure is in the normal position of use thereof.

According to another feature of the invention, the at least one connecting bar or each connecting bar is cranked (that is, has a curved shape) and has its concave side facing upwardly.

One embodiment of the invention will be described hereinafter with reference to the accompanying drawings in which:

FIGS. 2 and 3 are side elevational views of the seat structure in an intermediate position thereof;

FIG. 4 is a similar view after the complete conversion of the seat structure.

Figure 1:
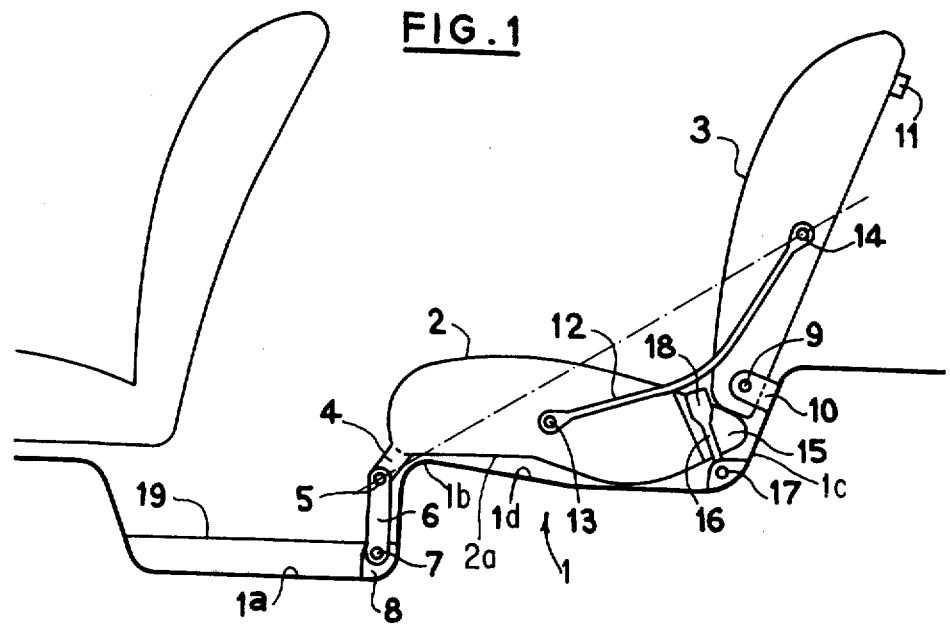
FIG. 1 is a side elevational view of the seat structure according to the invention in the normal position of use thereof.

The drawings show a support in the form of a floor 1 of an automobile vehicle carrying a rear seat structure comprising mainly a seat proper 2 and a backrest 3.

The seat 2 bears in support or the rear part thereof on the floor 1. It carries, under the front part thereof, at least one nose member 4 which is pivotally mounted on a transverse pin or shaft 5 carried by one end of a link 6 which is pivotally mounted on a transverse pin or shaft 7 carried by a bracket 8 rigid with a part 1a of the floor 1. When the seat occupies its normal position of use shown in FIG. 1, the link 6 has a substantially vertical orientation. One or two links disposed in the vicinity of the median part of the seat may be provided, or two links may be provided which are each placed at one end of this seat.

The backrest 3 is pivotally mounted, at the base thereof, on a transverse pin or shaft 9 carried by a bracket 10 rigid with a part 1c of the floor 1. In its normal position of use, this backrest bears, in the upper part thereof, against abutments 11 which are rigid with the body of the vehicle, it being possible to lock the backrest in this position by any suitable known means.

Provided on each side of the seat is a connecting bar 12 which is pivoted at 13 to the seat and at 14 to the backrest. The bar 12 is cranked that is, has a curved shape (see FIG. 1) and has the concave side thereof facing upwardly, as shown in the drawings, so as to completely clear the access to the seat structure.

The rear of the seat 2 is engaged on a sufficient length thereof under the base of the backrest 3 so as to avoid a gap being formed between these two parts.

Optionally, a recess 15 of small size may be formed near the rear edge of the seat 2 to allow the passage of arms 16 which are pivoted at 17 to the part 1a the floor 1 and provided with hooking means 18 for a safety belt (not shown).

In the normal position of use shown in FIG. 1, the pivot pin 13 is located below the line interconnecting the pivots 5 and 14. In starting in this position, when the loading volume of the vehicle is desired to be increased, it is sufficient, after having unlocked the backrest, to exert a forward thrust on its upper part so as to bring the whole of the seat structure to the final position shown in FIG. 4.

Figure 2:
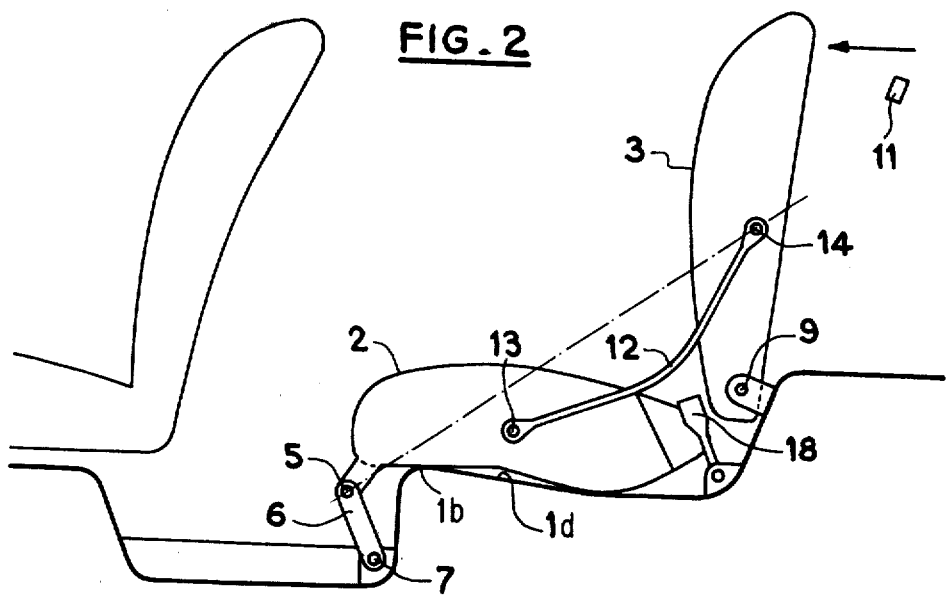

The differential stages of this movement are the following:

In the first part of the displacement of the backrest 3 in the forward direction, the arm 12 urges the seat 2 which in turn swings the link 6. In the course of this stage, the seat 2 is constrained to move forwardly in a substantially horizontal path while retaining a substantially constant orientation by the effect of constraining means comprising, in combination, the particular contour of a part 1d of the floor 1, which is located below the seat and has an ascending part leading to a rounded corner 1b of this floor, and the bottom surface 2a of the seat which has the illustrated particular contour. The surface 2a rides over the floor 1d, 1b in this first stage and, in thus constraining the seat to move in a substantially horizontal path while retaining a substantially constant orientation, permits the rear of the seat 2 to perfectly clear both at the base of the backrest and the hooking arms 16 for the safety belts (FIG. 2).

In continuing the movement, the link 6 continues to swing forwardly so that the front part of the seat 2 is lowered whereas the rear part of the surface 2a of the seat, in sliding on the ascending part of the floor 1, is urged upwardly. In this way, the raising of the seat 2 about the pivot 5 is initiated.

Rotation of the link 6 is stopped when the end thereof carrying the pivot 5 abuts against the part 1a of the floor 1. In this position (FIG. 3), it can be seen that the pivot 13 is then distinctly above the line intersecting the pivots 5 and 14. The movement can therefore continue without risk of jamming until the position shown in FIG. 4 is reached.

Thus it can be seen that the arrangement described attains the object of the invention owing to the mobility of the transverse pivot pin 5 of the seat 2. Indeed, it is this mobility which enables the seat 2 to be moved away forwardly and the pivot 12 to be placed relatively low while bringing it distinctly below the line intersecting the pivots 5 and 14 when the link 6 reaches its position of abutment.

In the embodiment just described, it has been assumed that the link 6 abuts the floor 1. The same result would be obtained by the bearing of the front part of the seat 2 against a longitudinal rib 19 of the floor 1, this rib defining a tunnel for the passage of a transmission between the engine-drive unit placed in the front of the vehicle and the rear set of driving wheels.

The description of the various operations of this device shows that the object of the invention has been attained.

Having now described my invention what I claim as new and desire to secure by Letters Patent is:

1. A convertible seat structure for an automobile vehicle and movable between an opened position for receiving a passenger and a closed position and comprising a support, a seat, link means for connecting the seat to the support and for allowing the seat to be forwardly raisable relative to the support about a first transverse axis, a backrest, means for connecting the backrest to the support and for allowing the backrest to be swung over forwardly relative to the support about a second transverse axis, at least one connecting bar pivoted to the seat and to the backrest to ensure that the movements of these two elements are simultaneous, and constraining means for controlling the orientation of the seat in the course of moving the seat structure between said two positions thereof, said link means including at least one link mounted adjacent a first end of the link on the support with the link pivotable about a third transverse axis relative to the support, the first transverse axis being disposed adjacent a second end of the link opposed to said first end of the link, the seat being pivotably connected to the link at the second end of the link, the link having a substantially vertical orientation when the seat structure is in said opened position, and said constraining means being operative, in a first stage of moving the seat structure from said opened position to said closed position thereof, to constrain the seat to move initially in a substantially horizontal direction while maintaining the seat in a substantially constant orientation thereof and thereafter to constrain the seat to swing upwardly and forwardly relative to the support about said first axis.

2. A seat structure as claimed in claim 1, wherein the at least one connecting bar is curved and has a concave side which faces generally upwardly.

3. A seat structure as claimed in claim 1 or 2, further comprising abutment means for limiting the pivotal movement of the link when the seat structure is in said closed position.

4. A seat structure as claimed in claim 3, wherein, in said opened position of the seat structure, the pivotal connection of the at least one connecting bar to the seat is located below a line intersecting the pivotal connection of the seat to the link and the pivotal connection of the bar to the backrest, whereas, in said closed position of the seat structure, the pivotal connection of the bar to the seat is located above said line, said constraining means comprising guide means rigid with the support and cooperative with a surface on the seat to guide the seat while said pivotal connection of the at lest one connecting bar to the seat travels from below to above said line intersecting the pivotal connection of the seat to the link and the pivotal connection of the bar to the backrest.

5. A seat structure as claimed in claim 1 or 2, wherein the seat has in the rear part thereof recesses for arms carrying mens for hooking safety belts, said recesses being shaped and disposed to allow the seat to move away from and leave the arms in said first stage.

6. A seat structure as claimed in claim 1 or 2 wherein the seat extends vertically beneath the backrest when the seat structure is in said opened position.

7. A convertible seat structure for an automobile vehicle and movable between an opened position for receiving a passenger and a closed position and comprising:
   a seat including means defining a downwardly facing surface;
   link means for pivotably connecting said seat to the vehicle, said link means including at least one link member pivotably connected to the vehicle at a first pivot and pivotably connected to the seat at a second pivot, said first pivot being adjacent a first end of the link and said second pivot being adjacent a second end of the link;
   a backrest pivotably connected to the vehicle;
   connecting means for connecting said seat and said backrest, said connecting means both moving said seat longitudinally with respect to the vehicle and pivoting said seat about said second pivot when said backrest is pivoted with respect to the vehicle;
   guide means mounted on the vehicle and guidingly engaging said surface of the seat, for guiding the seat so that the seat travels in a substantially horizontal direction while the seat maintains a substantially constant orientation during an initial part of the movement of the seat structure from said opened position of the seat structure, said guide means thereafter guiding the seat to swing upwardly and forwardly of the vehicle about said second pivot.

8. The convertible seat structure of claim 7 wherein the connecting means includes at least one connecting bar pivotably connected to the seat at a third pivot and pivotably connected to the backrest at a fourth pivot.

9. The converticle seat structure of claim 8 wherein the third pivot of the at least one connecting bar is below a line extending between the fourth pivot of the at least one connecting bar and the second pivot of the at least one link member when the seat structure is in said opened position and is above said line when the seat structure is in said closed position.

10. The convertible seat structure of claim 7, 8 or 9 wherein the seat extends vertically beneath the backrest when the seat structure is in said opened position.

* * * * *